US011885157B2

(12) United States Patent
Ayyawar et al.

(10) Patent No.: US 11,885,157 B2
(45) Date of Patent: Jan. 30, 2024

(54) LATCH ASSEMBLY

(71) Applicant: WHIRLPOOL CORPORATION, Benton Harbor, MI (US)

(72) Inventors: Kapil Ayyawar, St. Joseph, MI (US); Alexandre C. Azevedo, St. Joseph, MI (US); Pradip T. Bansode, Pune (IN); Ganesh Bramhane, Pune (IN); Fernando Garcia, Nuevo Leon (MX); Dakota E. Kosek, Benton Harbor, MI (US); Shrawan Kumar, St. Joseph, MI (US); Juan Pablo Ramirez Carrillo, South Bend, IN (US); Antonio Sanchez, Stevensville, MI (US)

(73) Assignee: Whirlpool Corporation, Benton Harbor, MI (US)

(*) Notice: Subject to any disclaimer, the term of this patent is extended or adjusted under 35 U.S.C. 154(b) by 0 days.

(21) Appl. No.: 17/717,460

(22) Filed: Apr. 11, 2022

(65) Prior Publication Data

US 2022/0235582 A1 Jul. 28, 2022

Related U.S. Application Data

(63) Continuation of application No. 16/256,536, filed on Jan. 24, 2019, now Pat. No. 11,359,414.

(51) Int. Cl.

| | |
|---|---|
| ***E05B 65/00*** | (2006.01) |
| ***E05B 17/00*** | (2006.01) |
| ***F25D 23/02*** | (2006.01) |
| ***F25D 23/04*** | (2006.01) |

(52) U.S. Cl.
CPC ...... *E05B 65/0042* (2013.01); *E05B 17/0037* (2013.01); *F25D 23/025* (2013.01); *F25D 23/028* (2013.01); *F25D 23/04* (2013.01); *F25D 2323/023* (2013.01)

(58) Field of Classification Search
CPC ............. E05B 65/0042; E05B 17/0037; E05B 65/0046; F25D 23/025; F25D 23/028; F25D 23/04; F25D 2323/023; F25D 2323/024; E05C 7/02
See application file for complete search history.

(56) References Cited

U.S. PATENT DOCUMENTS

| | | | | |
|---|---|---|---|---|
| 2,243,772 | A * | 5/1941 | Peltier | E05B 65/0046 292/226 |
| 2,802,684 | A | 7/1953 | Jacobson | |
| 2,803,480 | A | 12/1954 | Foster | |
| 3,364,621 | A | 1/1968 | Erickson | |

(Continued)

FOREIGN PATENT DOCUMENTS

| | | | |
|---|---|---|---|
| EP | 2886982 | A1 | 6/2015 |
| KR | 20130053318 | A | 5/2013 |

*Primary Examiner* — Hanh V Tran
(74) *Attorney, Agent, or Firm* — Price Heneveld LLP

(57) ABSTRACT

An appliance door closure assembly is provided and comprises an inner door selectively coupled with an outer door. An anchor is in connection with the inner door and defines a retention space. A latch assembly is in connection with the outer door. The latch assembly includes a first cam having a first contact surface and pivotally coupled to a base. A second cam has a second contact surface engaged with the first contact surface of the first cam. The latch assembly is movable between a first position and a second position.

15 Claims, 11 Drawing Sheets

(56) References Cited

U.S. PATENT DOCUMENTS

| | | | |
|---|---|---|---|
| 5,538,338 | A | 7/1996 | Biggers |
| 5,908,228 | A | 6/1999 | Lee |
| 8,752,918 | B2 | 6/2014 | Kang |
| 9,080,808 | B2 | 7/2015 | Choi et al. |
| 9,170,045 | B2 | 10/2015 | Oh et al. |
| 9,267,727 | B2 | 2/2016 | Lim et al. |
| 9,353,984 | B2 | 5/2016 | Kim et al. |
| 9,410,732 | B2 | 8/2016 | Choi et al. |
| 9,429,356 | B2 | 8/2016 | Kim et al. |
| 9,448,004 | B2 | 9/2016 | Kim et al. |
| 9,482,463 | B2 | 11/2016 | Choi et al. |
| 9,518,777 | B2 | 12/2016 | Lee et al. |
| 9,568,238 | B2 | 2/2017 | Kim et al. |
| 9,605,891 | B2 | 3/2017 | Lee et al. |
| 9,696,085 | B2 | 7/2017 | Seo et al. |
| 2004/0262972 | A1 | 12/2004 | Reubeuze |
| 2005/0212302 | A1 | 9/2005 | Fisher |
| 2009/0151257 | A1 | 6/2009 | Dominique |
| 2011/0074166 | A1 | 3/2011 | Taurasi et al. |
| 2011/0132024 | A1 | 6/2011 | Lim et al. |
| 2013/0026900 | A1 | 1/2013 | Oh et al. |
| 2013/0033163 | A1 | 2/2013 | Kang |
| 2013/0169139 | A1 | 7/2013 | Jung et al. |
| 2013/0170897 | A1 | 7/2013 | Kang et al. |
| 2014/0202220 | A1 | 7/2014 | Denison et al. |
| 2014/0354135 | A1 | 12/2014 | Celik et al. |
| 2015/0069900 | A1 | 3/2015 | Lim et al. |
| 2015/0176886 | A1 | 6/2015 | Lee et al. |
| 2015/0241116 | A1 | 8/2015 | Choi et al. |
| 2015/0260443 | A1 | 9/2015 | Lee et al. |
| 2016/0138855 | A1 | 5/2016 | Choo et al. |
| 2016/0356057 | A1 | 12/2016 | Lin et al. |
| 2017/0038126 | A1 | 2/2017 | Lee et al. |
| 2017/0175423 | A1 | 6/2017 | Gresham, IV et al. |
| 2017/0176086 | A1 | 6/2017 | Kang |
| 2017/0191746 | A1 | 7/2017 | Seo |
| 2017/0253281 | A1 | 9/2017 | Kwak et al. |
| 2017/0260775 | A1 | 9/2017 | Denison et al. |
| 2018/0100657 | A1 | 4/2018 | Yantis |
| 2018/0163433 | A1 | 6/2018 | Schmidt et al. |
| 2018/0202707 | A1 | 7/2018 | Park |
| 2019/0063123 | A1 | 2/2019 | Ham et al. |
| 2019/0119959 | A1 | 4/2019 | Kumar |
| 2019/0120542 | A1 | 4/2019 | Kim et al. |
| 2019/0338999 | A1 | 11/2019 | Lee |
| 2019/0360745 | A1 | 11/2019 | Lee et al. |
| 2020/0386010 | A1 | 12/2020 | Lv et al. |

* cited by examiner

LATCH ASSEMBLY

CROSS-REFERENCE TO RELATED APPLICATION

This application is a continuation of U.S. patent application Ser. No. 16/256,536, filed on Jan. 24, 2019, now U.S. Pat. No. 11,359,414, entitled LATCH ASSEMBLY, the entire disclosure of which is hereby incorporated by reference.

FIELD

The present device generally relates to a latch assembly, and more specifically to a latch assembly for an appliance.

BACKGROUND

When a door assembly includes an outer door and an inner door, the outer door may be coupled to the inner door using a seal, such as a magnetic gasket. An improved method of coupling the outer door to the inner door is provided herein.

SUMMARY

In at least one aspect of the present disclosure, an appliance door assembly is provided and may comprise an inner door including a first housing. The first housing may define a first housing cavity. An outer door may be selectively coupled with the inner door and may include a second housing. The second housing may define a second housing cavity. An anchor may be positioned within the first housing cavity. The anchor may be positioned to extend outward of the first housing cavity. The anchor may define a retaining space. A latch assembly may be positioned within the second housing cavity. The latch assembly may include a first cam having a first contact surface. A second cam may have a second contact surface. The first contact surface may be configured to engage with a portion of the second contact surface. The second cam may define a hook. The hook may be selectively engaged with the anchor. A spring may be configured to bias the second cam to an unlocked position. An actuation member may be coupled to the first cam and may be configured to selectively move the first cam into an inclined position.

In at least another aspect of the present disclosure, an appliance door closure assembly may be provided and may comprise an anchor positioned within a first housing. A latch assembly may be positioned within a second housing. The latch assembly may include a first cam pivotally coupled to a sidewall of the second housing. A second cam may be pivotally coupled to the sidewall of the second housing and may be engaged with the first cam. The second cam may define a hook. A spring may be configured to bias the second cam to a first position.

In at least another aspect of the present disclosure, an appliance door closure assembly is provided and may comprise an inner door selectively coupled with an outer door. An anchor may be in connection with the inner door and may define a retention space. A latch assembly may be in connection with the outer door. The latch assembly may include a first cam having a first contact surface and pivotally coupled to a base. A second cam may have a second contact surface engaged with the first contact surface of the first cam. Each of the first and second cams may be movable between a first position and a second position.

These and other features, advantages, and objects of the present device will be further understood and appreciated by those skilled in the art upon studying the following specification, claims, and appended drawings.

DETAILED DESCRIPTION OF EMBODIMENTS

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 8:
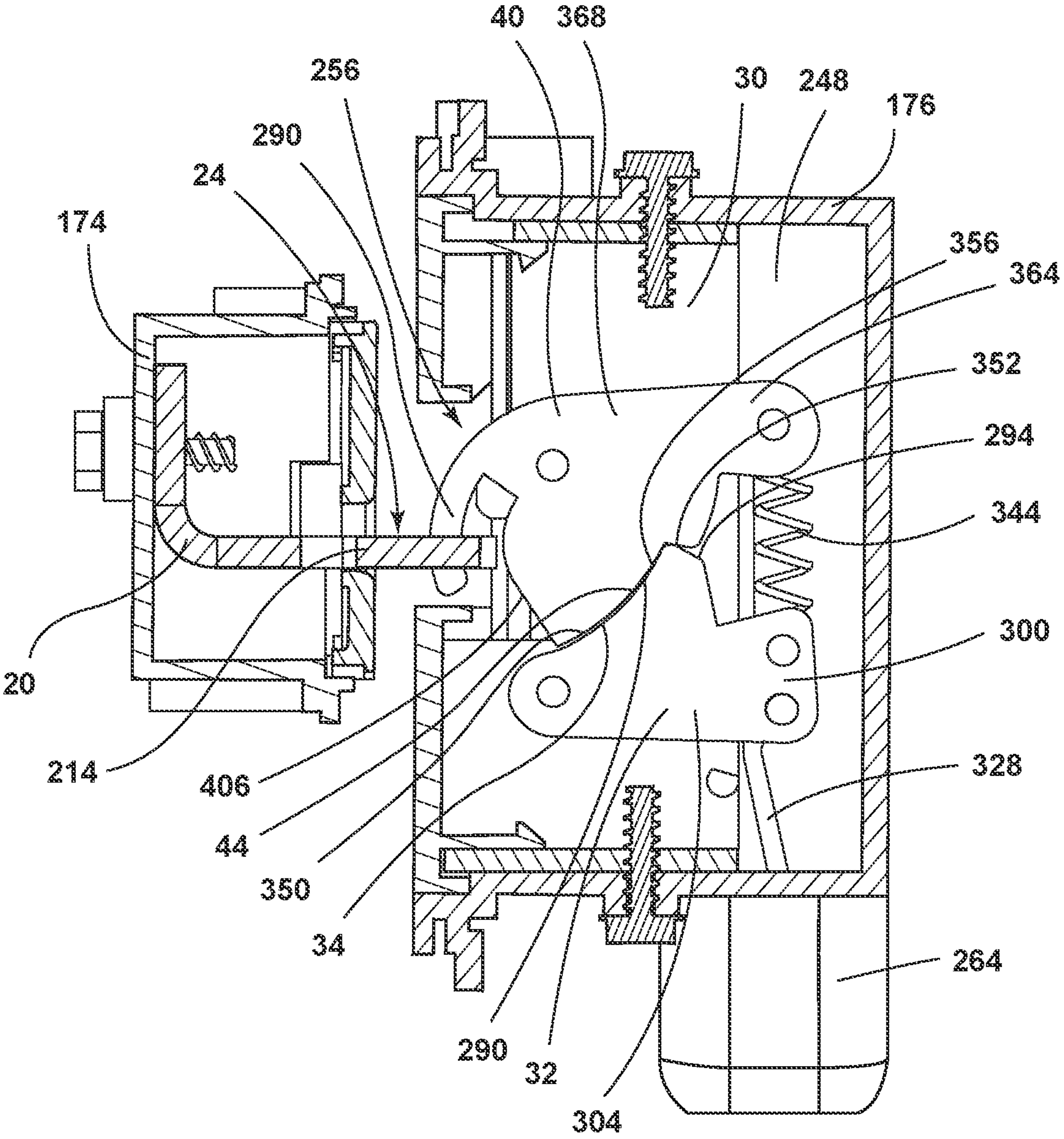
FIG. 8 is a side profile view of the latch cavity of FIG. 5 with a latch assembly in a second position.

Referring to the embodiment illustrated in FIGS. 1-8, an appliance door closure assembly 10 is provided and may include an inner door 14 selectively coupled with an outer door 16. An anchor 20 may be in connection with the inner door 14 and may define a retention space 24. A latch assembly 28 may be in connection with the outer door 16. The latch assembly 28 may include a first cam 32 having a first contact surface 34 and pivotally coupled to a base 30. A second cam 40 may have a second contact surface 44 engaged with the first contact surface 34 of the first cam 32. The latch assembly 28 may be movable between a first position (FIG. 7) and a second position (FIG. 8).

Figure 1:
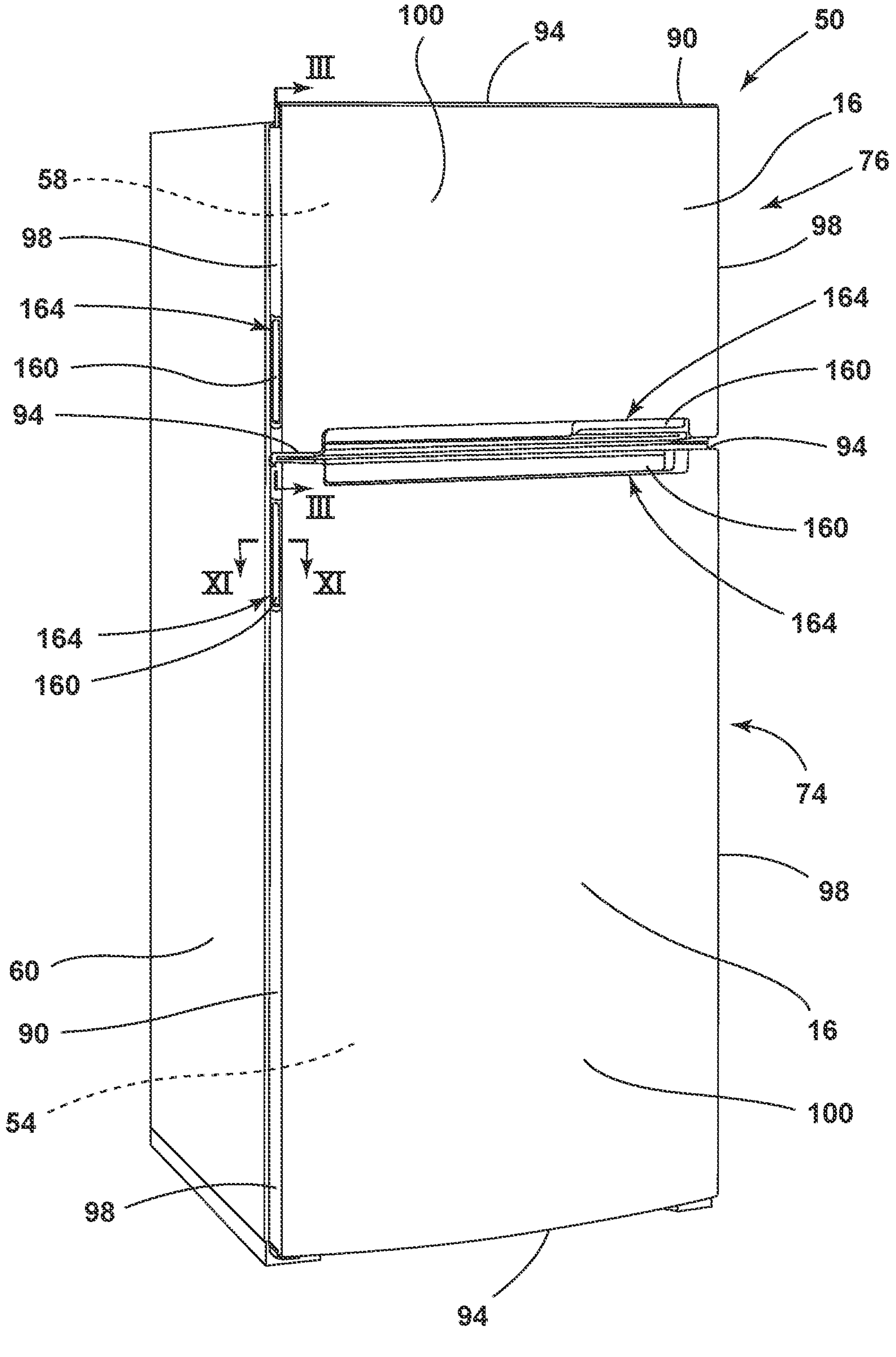
FIG. 1 is a front perspective view of a refrigeration appliance having a door assembly in a closed position.
Figure 2:
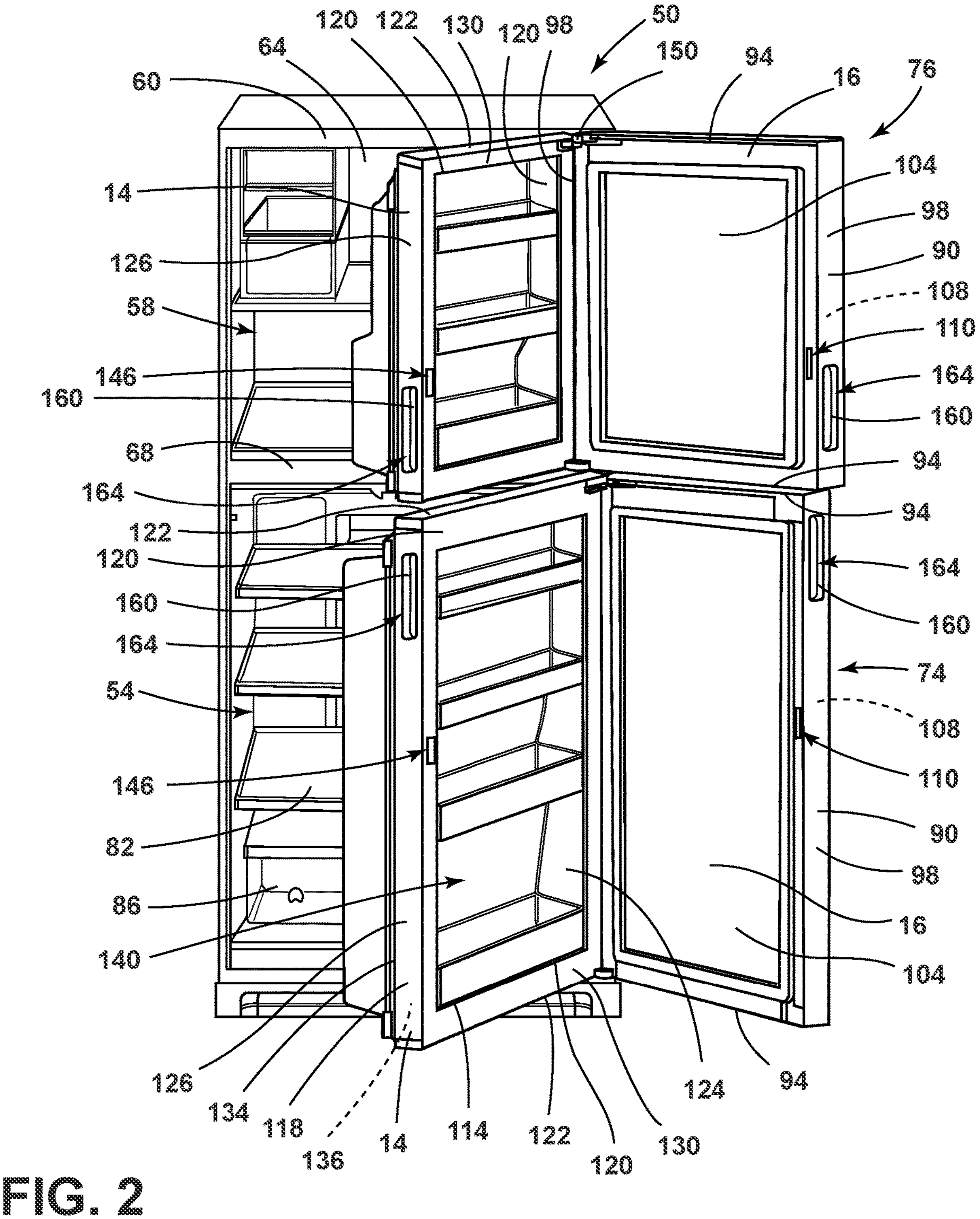
FIG. 2 is a top perspective view of the refrigeration appliance and door assembly of FIG. 1 where an inner door and an outer door of the door assembly are each in an open position.

Referring to FIGS. 1 and 2, a refrigerated appliance 50 is shown having a refrigerated compartment 54 configured to refrigerate consumables and a freezer compartment 58 configured to freeze consumables during normal use. Accordingly, the refrigerated compartment 54 may be kept at a temperature above the freezing point of water and generally below a temperature of from about 35° F. to about 50° F., more typically below about 38° F. and the freezer compartment 58 may be kept at a temperature below the freezing point of water. In some instances, the refrigerated appliance 50 may have a cabinet 60 and a liner 64 within the cabinet 60 to define the refrigerated compartment 54 and the freezer compartment 58. A mullion 68 may separate the refrigerated compartment 54 and the freezer compartment 58. FIGS. 1 and 2 generally show a refrigerator of the French-door bottom mount type, but it is understood that this disclosure could apply to any type of refrigerator, such as a side-by-side, two-door bottom mount, or a top-mount type refrigeration unit.

The refrigerated appliance 50 may have one or more door assemblies 74, 76 that provide selective access to the interior volume of the refrigerated appliance 50 where consumables may be stored. As shown, the refrigerated compartment door assembly 74 selectively closes the refrigerated compartment 54, and the freezer door assembly 76 selectively closes the freezer compartment 58. It is appreciated that the refrigerated compartment 54 may have a single door assembly 74 or a pair of door assemblies 74. It is also appreciated that the freezer compartment 58 may have a sliding door assembly rather than a hinged assembly, as shown.

Storage shelves 82 and bin assemblies 86 may be positioned within the refrigerated compartment 54 and the freezer compartment 58. The bin assemblies 86 may act as drawers for a variety of purposes including, for example, a crisper drawer or a pantry drawer.

As shown in FIGS. 1 and 2, each of the door assemblies 74, 76 may include an inner door 14 and an outer door 16. Each outer door 16 may include a peripheral wall 90 having a pair of lateral portions 94 and a pair of longitudinal portions 98. The lateral portions 94 may be oriented parallel to the base of the refrigerated appliance 50. Similarly, the longitudinal portions 98 may be positioned perpendicular to and extending between the lateral portions 94. According to various examples, the lateral portions 94 may be shorter in length than the longitudinal portions 98. In other examples, the lateral portions 94 may be the same length as the longitudinal portions 98. The peripheral wall 90 may couple an outer panel 100 of the outer door 16 and an inner panel 104 of the outer door 16, extending about the periphery of both the outer panel 100 and the inner panel 104. According to various examples, the peripheral wall 90, the outer panel 100, and the inner panel 104 of the outer door 16 may define a first cavity 108. The first cavity 108 may extend about the periphery of the outer door 16 and may be further defined by an interior wall in various examples. In other examples, the first cavity 108 may be defined by the entirety of the outer door 16. In still other examples, the first cavity 108 may be defined within the outer door 16 and may be positioned proximate one of the longitudinal portions 98 of the peripheral wall 90.

As shown in FIG. 2, the inner panel 104 of each outer door 16 may further define a first opening 110. According to various examples, the first opening 110 may be in communication with the first cavity 108. The first opening 110 may be defined proximate the peripheral wall 90. The first opening 110 may be generally rectangular, but also may be generally circular, oblong, square, or shaped like any other higher order polygon. The opening 110 may include sealing features positioned about the perimeter of the opening 110 and/or may include a cover for the edge forming the perimeter of the opening 110 without departing from the scope of the present disclosure.

With reference again to FIG. 2, each inner door 14 may have an inner peripheral wall 114 and an outer peripheral wall 118. Each of the inner and outer peripheral walls 114, 118 may include a pair of lateral portions 120, 122 and a pair of longitudinal portions 124, 126, respectively. The lateral portions 120, 122 may be oriented parallel to the base of the refrigerated appliance 50. Similarly, the longitudinal portions 124, 126 may be positioned perpendicular to the lateral portions 120, 122. According to various examples, the lateral portions 120, 122 may be shorter in length than the longitudinal portions 124, 126. In other examples, the lateral portions 120, 122 may be the same length as the longitudinal portions 124, 126. The lengths of the lateral portions 122 of the outer peripheral wall 118 of the inner door 14 are configured to complement the lengths of the lateral portions 94 of the peripheral wall 90 of the respective outer door 16. Similarly, the lengths of the longitudinal portions 126 of the outer peripheral wall 118 of the inner door 14 are configured to complement the lengths of the longitudinal portions 98 of the peripheral wall of the respective outer door 16. Further, the inner peripheral wall 114 is configured to have dimensions that are less than the outer peripheral wall 118 of the inner door 14. It will be understood that the dimensions of the inner and outer doors 14, 16 of various door assemblies may be selected so that the dimensions do not complement one another. For example, the freezer door assembly 76 may have dimensions that differ from the dimensions of the refrigerated compartment door assembly 74 without departing from the scope of the present disclosure.

An outer panel 130 of the inner door 14 and an inner panel 134 of the inner door 14 may be coupled by the inner and outer peripheral walls 114, 118 to form a continuous channel 136. Together with the inner peripheral wall 114, the outer panel 130, and the inner panel 134 of the inner door 14 may define a through space 140. A plurality of door storage features may be positioned within the through space and may extend between the longitudinal portions 124 of the inner peripheral wall 114 of the inner door 14. According to various examples, the through space 140 may extend from a top portion to a bottom portion of the inner door 14. In other examples, the through space 140 may extend only partially between the top portion and the bottom portion of the inner door 14.

The outer panel 130 of each inner door 14 may further define a second opening 146. According to various examples, the second opening 146 may be in communication with the channel 136 of the inner door 14. The second opening 146 may be defined by the outer panel 130 between the inner peripheral wall 114 and the outer peripheral wall 118. The second opening 146 may be generally rectangular, according to various examples. In other examples, the second opening 146 may be generally circular, oblong, square, or shaped like any other higher order polygon. The opening 146 may include sealing features positioned about the perimeter of the opening 146 and/or may include a cover for the edge forming the perimeter of the opening 146 without departing from the scope of the present disclosure.

Referring again to FIGS. 1 and 2, according to various examples, the inner door 14 and the outer door 16 may each be pivotally coupled to the cabinet 60 of the refrigerated appliance 50 by a first hinge assembly 150. In other examples, the inner door 14 may be pivotally coupled to the cabinet 60 of the refrigerated appliance 50 by a first hinge assembly 150. The outer door 16 may be pivotally coupled to the inner door 14 by a second hinge assembly 154 positioned forward of the first hinge assembly 150.

Each of the inner door 14 and the outer door 16 is movable between an open position (FIG. 1) and a closed position (FIG. 2). The inner door 14 and the outer door 16 are movable independently, such that the outer door 16 may be in the open position while the inner door 14 remains in the closed position. The first and second hinge assembly 150, 154 may cooperate when the inner door 14 and the outer door 16 are moved between open and closed positions. When the outer door 16 is in the closed position, the first and second openings 110, 146 of the inner and outer doors 14, 16, respectively, may be aligned. The outer door 16 may be selectively engaged with the inner door 14 by the door closure assembly 10 when the outer door 16 is in the closed position.

Each of the inner door 14 and the outer door 16 of each door assembly 74, 76 may include a handle 160. According to various examples, the handle 160 may be a pocket handle 160. The pocket handle 160 may be positioned on one of the longitudinal portions 98, 126 of the peripheral wall 90 of the outer door 16 and/or the outer peripheral wall 118 of the inner door 14. For example, the pocket handle 160 may be positioned on one of the longitudinal portions 98 of the peripheral wall 90 of the outer door 16 opposite the hinge assemblies 150, 154. Alternatively, the pocket handle 160 may be positioned on one of the lateral portions 94, 122 of the peripheral wall 90 of the outer door 16 and/or the outer peripheral wall 118 of the inner door 14. For example, the pocket handle 160 may be positioned on the lateral portion 94 of the peripheral wall 90 proximate the mullion 68.

In some examples, more than one pocket handle 160 may be positioned on the door assembly 74, 76. For example, a pocket handle 160 may be positioned on the inner door 14 and a pocket handle 160 may be positioned on the outer door 16. In other examples, the door assembly 74, 76 may include only one pocket handle 160. Each pocket handle 160 may include a cavity 164 defined by the respective portion 94, 98, 122, 126 of the respective peripheral wall 90, 118. According to various examples, the cavity 164 may be hidden by the inner and outer panels 100, 104, 130, 134 of the outer door 16 or the inner door 14, respectively. In other examples, the cavity 164 may be at least partially exposed (FIG. 1). In still other examples, the cavity 164 may be defined partially by the peripheral wall 90, 118 of the outer door 16 or the inner door 14 and at least partially by a plate aligned with the outer panel 100, 130 of the respective door assembly 74, 76. It is also contemplated that the pocket handles 160 may be used in conjunction with pull handles or other appliance handles.

Figure 3:
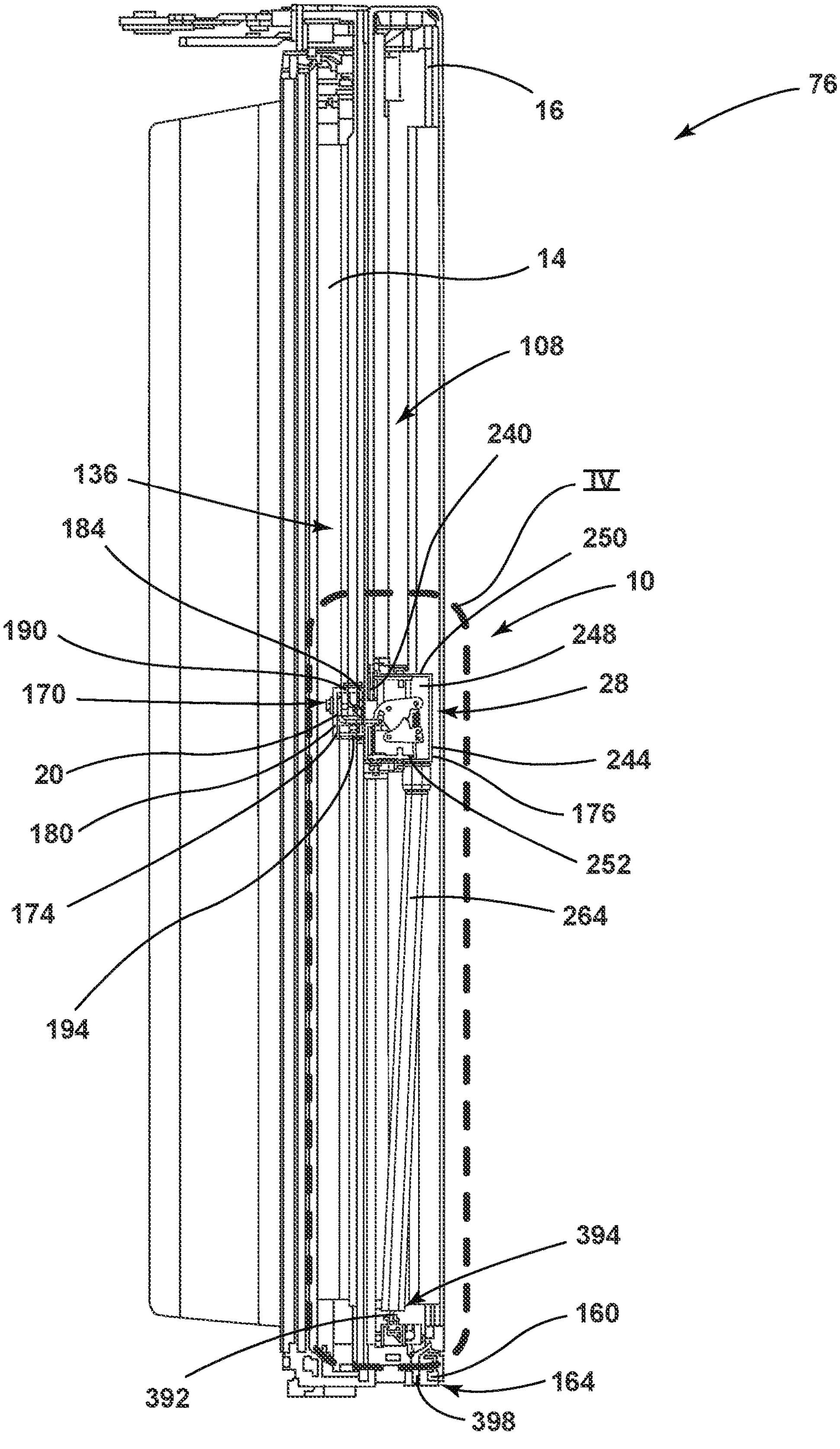
FIG. 3 is a cross-sectional view of an inner door and an outer door taken along line III-Ill of FIG. 1 with the inner door in a closed position and the outer door in a closed position and having a closure assembly, according to various examples.

As shown in FIG. 3, the door closure assembly 10 may be coupled to one of the door assemblies 74, 76. For example, as shown in FIG. 3, the door closure assembly 10 may be coupled to the freezer door assembly 76. The door closure assembly 10 may include an anchor assembly 170 including at least the anchor 20. The door closure assembly 10 may further include the latch assembly 28. According to various examples, the door closure assembly 10 may include first and second housings 174, 176 configured to house the anchor assembly 170 and the latch assembly 28, respectively. In other examples, the anchor assembly 170 may be in connection with the inner door 14, and the latch assembly 28 may be in connection with the outer door 16. In still other examples, the anchor assembly 170 may be in connection with the outer door 16, and the latch assembly 28 may be in connection with the inner door 14.

Referring to FIGS. 1-3, when the door closure assembly 10 includes the first and second housings 174, 176, the first housing 174 may be positioned within the channel 136 of the inner door 14. The first housing 174 may be positioned proximate the second opening 146 defined by the outer panel 130 of the inner door 14. Similarly, the second housing 176 may be positioned in the cavity 108 defined by the outer door 16. The second housing 176 may be positioned proximate the first opening 110 defined by the inner panel 104 of the outer door 16.

Figure 4:
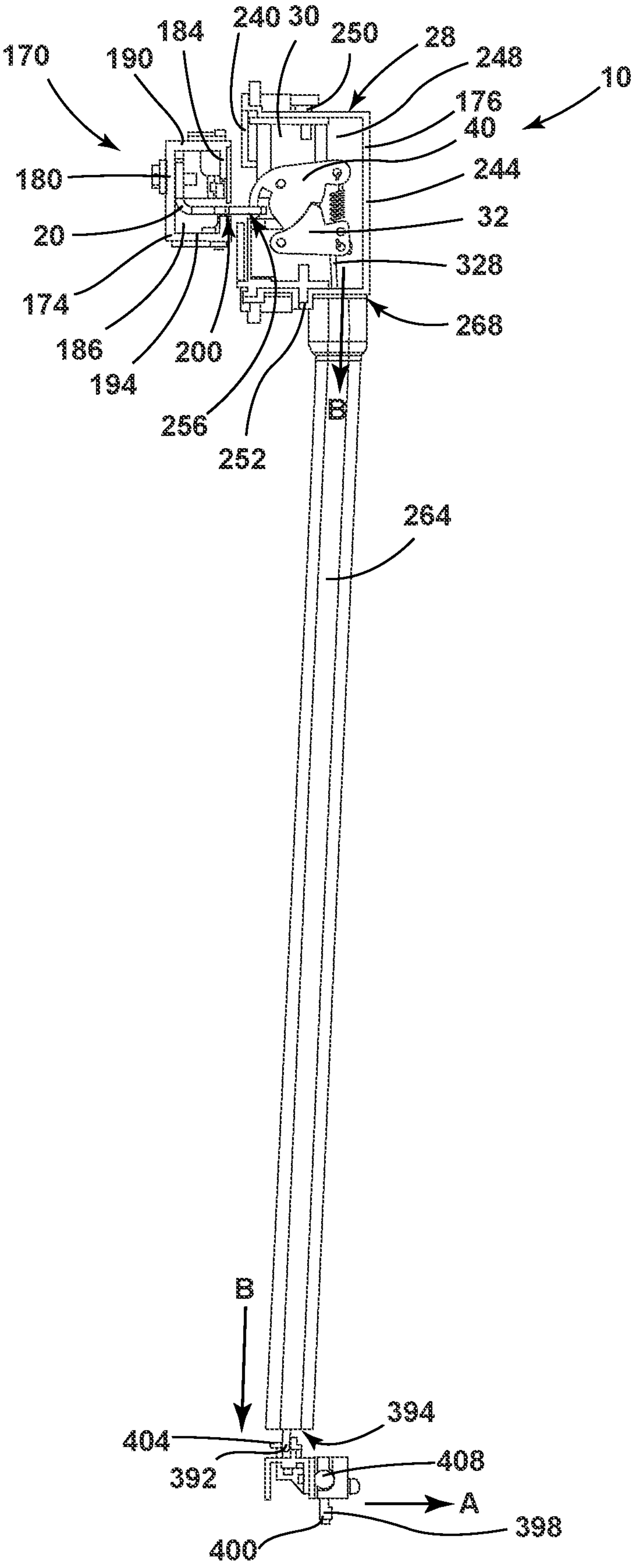
FIG. 4 is an enlarged view of the closure assembly of FIG. 3.
Figure 5:
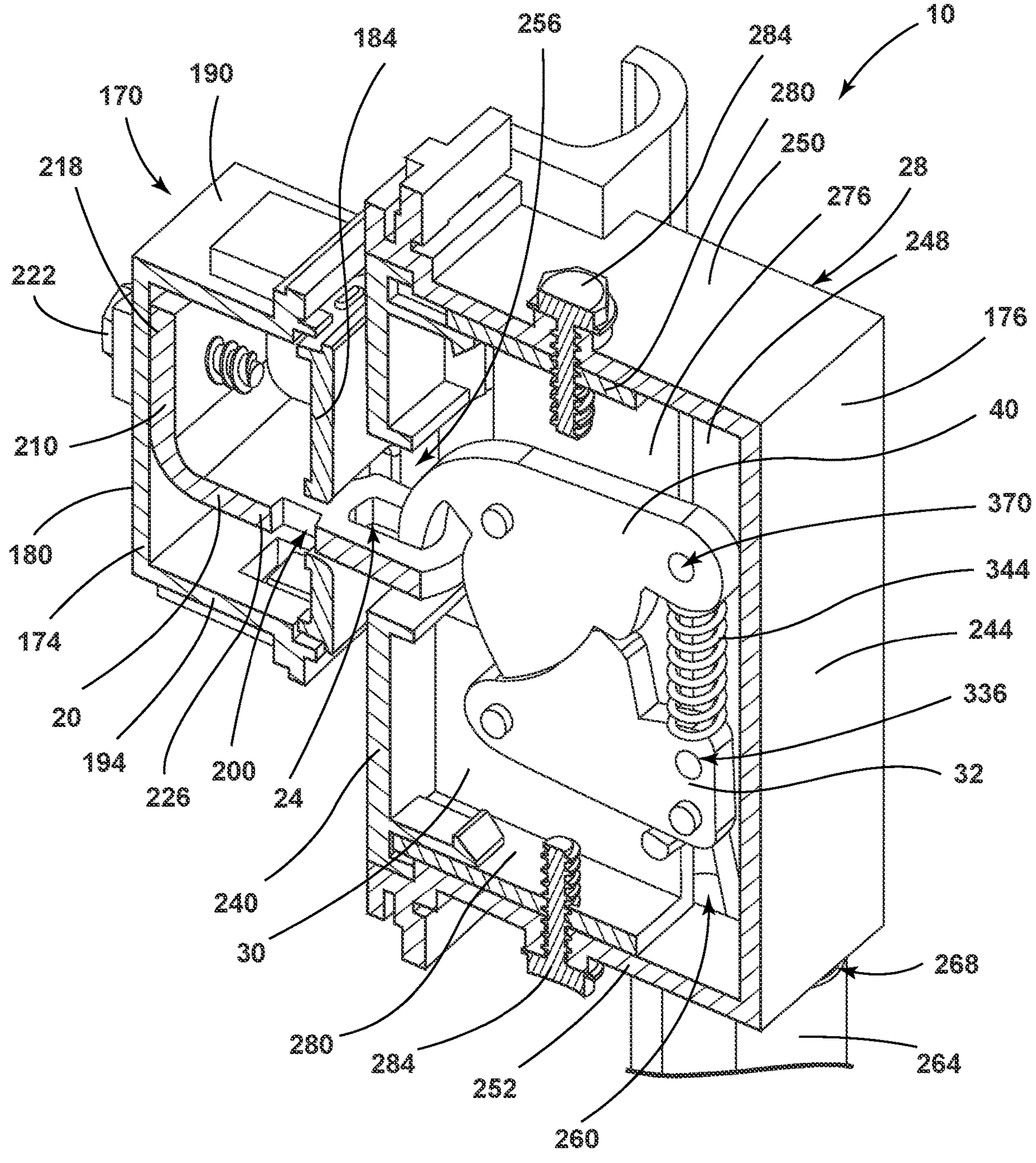
FIG. 5 is an enlarged side perspective cross-sectional view of a latch cavity of the closure assembly of FIG. 3.

Referring now to FIGS. 3-5, the first housing 174 may include a rear wall 180 and a front wall 184 joined by at least one sidewall 186, a top wall 190, and a bottom wall 194. The rear wall 180, the front wall 184, the sidewall 186, the top wall 190, and the bottom wall 194 may be integrally formed or otherwise coupled together. For example, the front wall 184 may be configured to snap engage or otherwise selectively couple to the other walls 180, 186, 190, 194. Alternatively, the front wall 184 may be integrally formed with the other walls 180, 186, 190, 194. It will be understood that any one or more of the walls 180, 184, 186, 190, 194 may be separately formed and otherwise coupled to the other walls 180, 184, 186, 190, 194. It will also be understood that the at least one sidewall 186 may be a single sidewall 186 or a pair of sidewalls 186 spaced apart by one or more of the rear wall 180, front wall 184, top wall 190, or bottom wall 194.

At least one of the rear wall 180, the front wall 184, the sidewall 186, the top wall 190, and the bottom wall 194 may be operably coupled to the inner door 14. The front wall 184 may define a receiving space 200 configured to be aligned with the opening 146 defined by the outer panel 130 of the inner door 14. According to various examples, the receiving space 200 may be sized to complement the opening 146 defined by the outer panel 130 of the inner door 14. In other examples, the receiving space 200 may be configured to be smaller than the opening 146. In some examples, the receiving space 200 may be sized to complement the dimensions of the anchor 20, such that the anchor 20 is substantially flush within the edge of the receiving space 200. It is also contemplated that the receiving space 200 and the opening 146 of the outer panel 130 of the inner door 14 may be one and the same, such that the outer panel 130 of the inner door 14 acts as the front wall 184 of the housing 174.

Referring now to FIGS. 4 and 5, the first housing 174 may be configured to house the anchor 20. According to various examples, the anchor 20 may have a body portion 210 and a connection portion 214. The anchor 20 is positioned within the first housing 174 such that a first end 218 of the body portion 210 is positioned substantially flush with the rear wall 180 of the first housing 174. The first end 218 of the body portion 210 may be coupled to the rear wall 180 by fastener 222. The body portion 210 may be shaped to form a corner. The corner may be angular or radiused and may be positioned at about a right angle. In various examples, the corner may be positioned substantially flush with the rear wall 180.

A second end 226 of the body portion 210 is positioned on the opposite side of the corner, such that the second end 226 is sufficiently perpendicular to the first end 218 of the body portion 210. The second end 226 of the body portion 210 is integrally formed with the connection portion 214. The connection portion 214 extends through the receiving space 200 defined by the front wall 184 of the first housing 174. The connection portion 214 may be tapered toward the second end 226 of the body portion 210. According to various examples, the connection portion 214 may be generally shaped like a rectangle. In other examples, the connection portion 214 may be generally shaped as a circle, oval, square, or other higher order polygon. In still other examples, the connection portion 214 may be shaped as an irregular polygon having narrow and wide sections to facilitate the extension of the connection portion 214 through the receiving space 200. It will be understood that the anchor 20 may be in connection with the inner door 14 directly without the first housing 174 without departing from the scope of the present disclosure.

Referring to FIGS. 2, 4, and 5, the retention space 24 may be defined by the connection portion 214. According to various examples, the retention space 24 may be shaped to generally complement the overall shape of the connection portion 214. In other examples, the retention space 24 may have a shape that differs from the overall shape of the connection portion 214. When the connection portion 214 extends outward through the receiving space 200 and the opening 146 of the inner door 14, the connection portion 214 extends outward of the inner door 14 and is positioned substantially perpendicular to the outer panel 130 of the inner door 14. Alternatively, the connection portion 214 may extend only through the receiving space 200 and may be recessed within the opening 146 of the inner door 14.

Referring again to FIGS. 4 and 5, the second housing 176 may include a rear wall 240 and a front wall 244 joined by at least one sidewall 248, a top wall 250, and a bottom wall 252. The rear wall 240, the front wall 244, the sidewall 248, the top wall 250, and the bottom wall 252 may be integrally formed or otherwise coupled together. For example, the rear wall 240 may be configured to snap engage or otherwise selectively couple to the other walls 244, 248, 250, 252. Alternatively, the rear wall 240 may be integrally formed with the other walls 244, 248, 250, 252. It will be understood that any one or more of the walls 240, 244, 248, 250, 252 may be separately formed and otherwise coupled to the other walls 240, 244, 248, 250, 252. It will also be understood that the at least one sidewall 248 may be a single sidewall 248 or a pair of sidewalls 248 spaced apart by one or more of the rear wall 240, front wall 244, top wall 250, or bottom wall 252.

At least one of the rear wall 240, front wall 244, top wall 250, or bottom wall 252 may be operably coupled to the outer door 16. The rear wall 240 may define a latch opening 256 configured to be aligned with the opening 110 defined by the inner panel 104 of the outer door 16. According to various examples, the latch opening 256 may be sized to mirror the opening 110 of the outer door 16. In other examples, the latch opening 256 may be configured to be smaller than the opening 110. The latch opening 256 may be sized to allow rotation of the second cam 40 at least partially through the latch opening 256 without abutting the second housing 176. It is also contemplated that the latch opening 256 and the opening 110 of the outer door 16 may be one and the same, such that the inner panel 104 of the outer door 16 acts as the rear wall 240 of the housing 176.

The bottom wall 252 of the second housing 176 may define an opening 260. The bottom wall 252 of the second housing 176 may be coupled to a sleeve 264, such that the opening 260 defined by the bottom wall 252 and a first open end 268 of the sleeve 264 are aligned. The opening 260 may be in communication with the first open end 268 of the sleeve 264. It will be understood that any one of the walls 240, 244, 248, 250, 252 of the second housing 176 may define the opening 260 and may be coupled to the sleeve 264 with the wall selection being based on the positioning of the door closure assembly 10 within the door assembly 74, 76. It will further be understood that the latch assembly 28 may be in connection with the outer door 16 directly without the second housing 176 without departing from the scope of the present disclosure.

Figure 6:
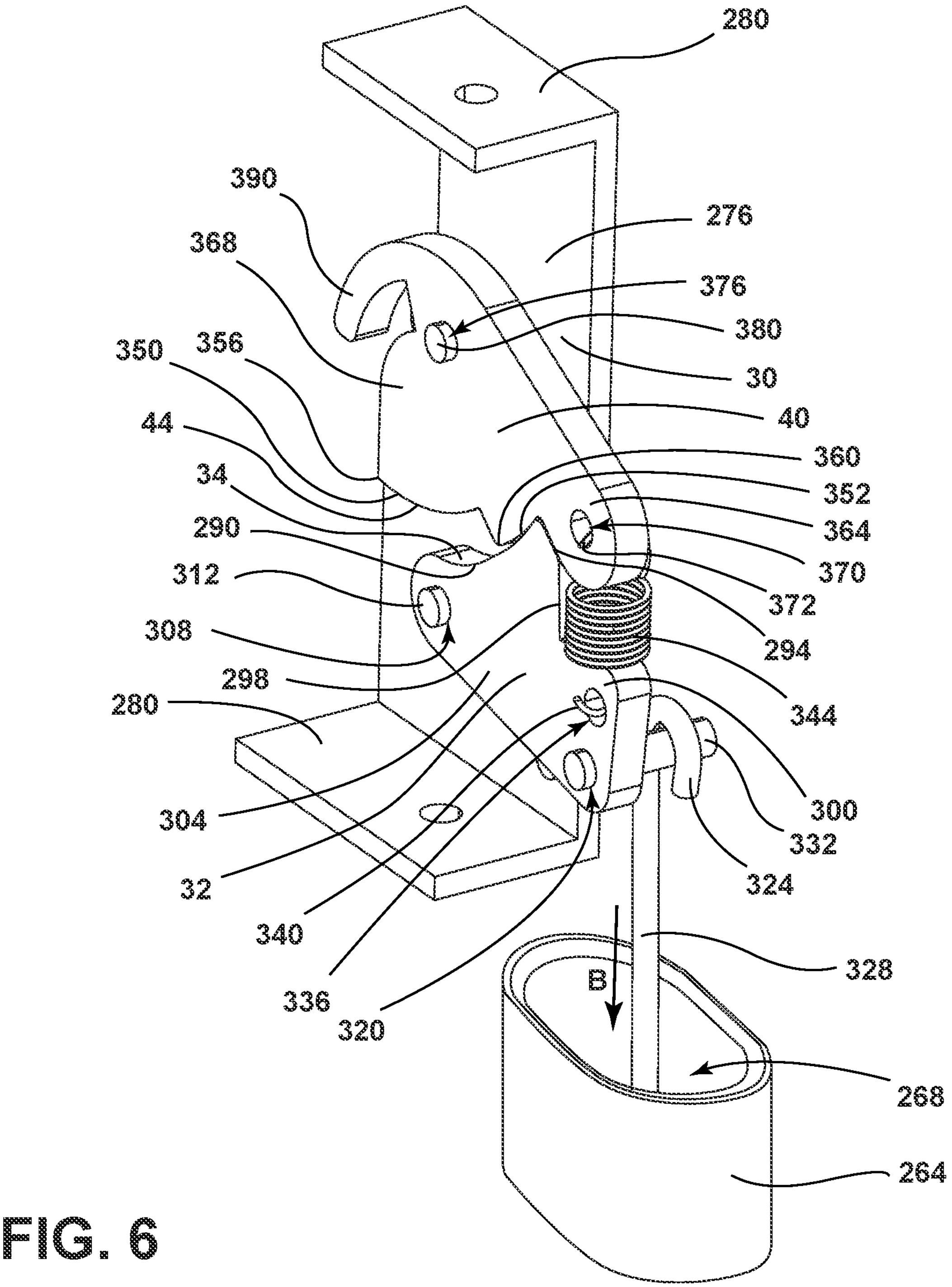
FIG. 6 is a side perspective view of a latch assembly of the closure assembly of FIG. 5.
Figure 7:
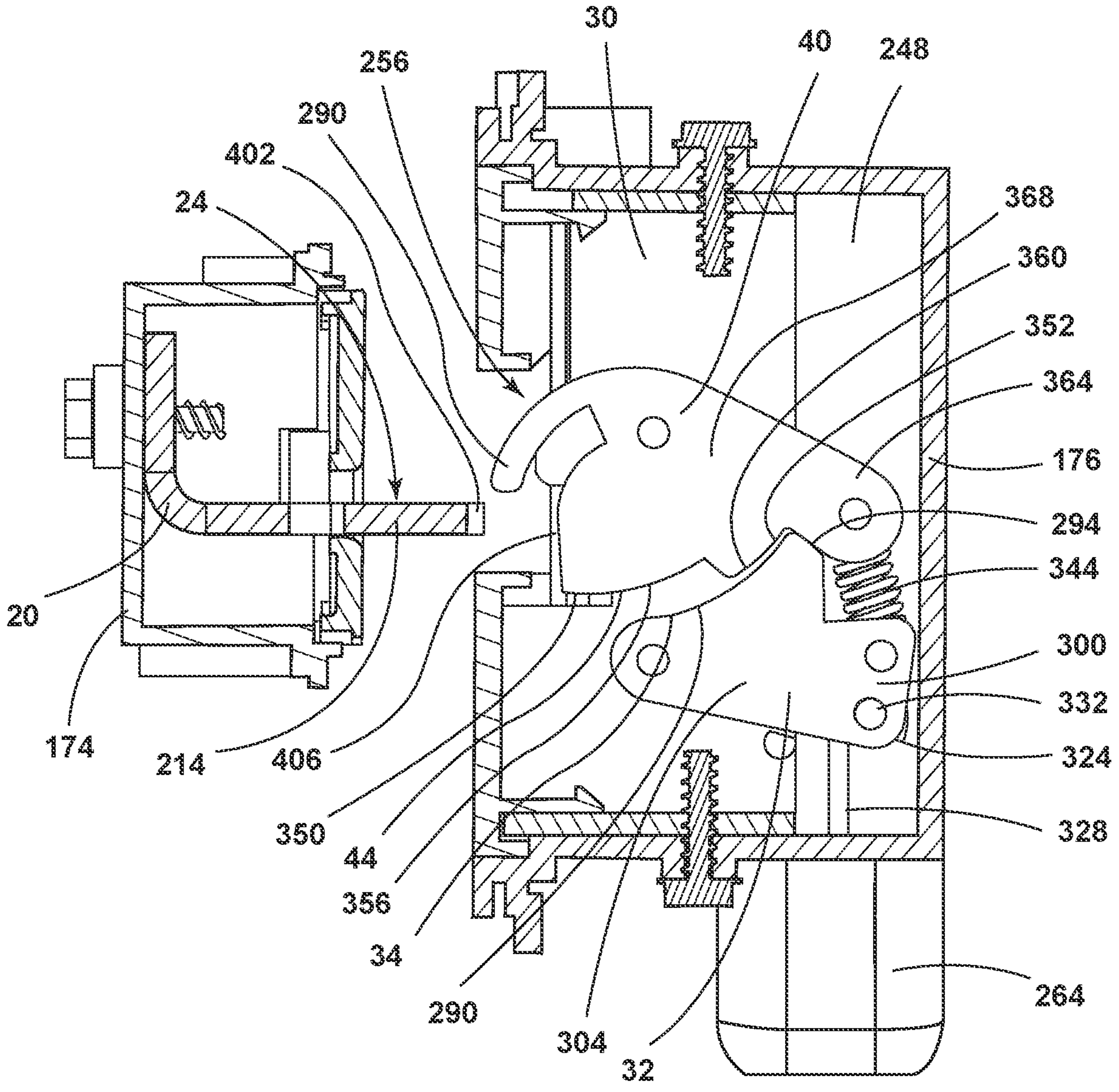
FIG. 7 is a side profile view of the latch cavity of FIG. 5 with a latch assembly in a first position.

Referring now to FIGS. 5 and 6, according to various examples, the base 30 may be positioned within the second housing 176. The base 30 may have a primary wall 276 configured to be aligned with the sidewall 248 of the second housing 176. A foot 280 may be positioned on each end of the primary wall 276. Each foot 280 may extend perpendicularly to the primary wall 276, such that each foot 280 is aligned with and parallel to one of the top wall 250 and the bottom wall 252. According to various examples, the base 30 may be sized to fit within the second housing 176, such that the primary wall 276 is substantially flush with the sidewall 248 of the second housing 176 and each foot 280 is substantially flush with one of the top wall 250 and the bottom wall 252, respectively. In other examples, the base 30 may be positioned within the second housing 176, such that the primary wall 276 is offset from the sidewall 248 and divides the second housing 176.

At least one fastener 284 may be used to couple each foot 280 of the base 30 to the respective top or bottom wall 250, 252. It will be understood that the base 30 may be integrally formed with the second housing 176 or may be coupled to the second housing 176 using other methods, such as, for example, adhesive or welding. It will also be understood that the sidewall 248 of the second housing 176 may act as the base 30 where the sidewall 248 forms the primary wall 276 and the top and bottom walls 250, 252 are each foot 280, respectively. It is also contemplated that the base 30 may be operably coupled with the outer door 16 without the second housing 176 without departing from the scope of the present disclosure.

Referring still to FIGS. 5 and 6, the first and second cams 32, 40 are pivotally coupled to the primary wall 276 of the base 30. The first cam 32 includes an upper edge 290 integrally formed with a raised edge 294. The upper edge 290 may be generally arcuate or curved and may be concave relative to the top of the first cam 32. The upper edge 290 includes the first contact surface 34 of the first cam 32. The first contact surface 34 may be positioned substantially perpendicular to the primary wall 276. The first contact surface 34 is positioned proximate to the second cam 40 and may be configured to engage with the second contact surface 44 of the second cam 40, as discussed elsewhere herein.

The raised edge 294 is further integrally formed with a side edge 298. In some examples, the raised edge 294 may be inclined away from the upper edge 290 and toward the side edge 298. The side edge 298 may extend linearly from the raised edge 294. The upper edge 290, the raised edge 294, and the side edge 298 may extend partially about a periphery of a primary portion 304 of the first cam 32. The primary portion 304 of the first cam 32 may define a pivot aperture 308 configured to receive a pivot pin 312. The pivot pin 312 may further be coupled to the primary wall 276 of the base 30, such that the first cam 32 is rotatable between an inclined position (FIG. 7) and a neutral position (FIG. 8).

A first protrusion 300 extends from the side edge 298 and may be integrally formed with the primary portion 304 of the first cam 32. The first protrusion 300 defines a first connection aperture 320. According to various examples, the first connection aperture 320 is defined at a first side of the first protrusion 300 and may be configured to engage with a connection end 324 of an actuation member 328. The actuation member 328 extends through the sleeve 264 operably coupled to the bottom wall 252 of the second housing 176 and through the opening 260 defined by the bottom wall 252 of the second housing 176. It will be understood that the actuation member 328 may be a rod, cable, or any other member capable of translating force. It will also be understood that the connection end 324 of the actuation member 328 may be a hook, loop, or any other connection configured to be received by or coupled to the connection aperture 320 and/or the second cam 40. For examples, a pin 332 may be positioned through the connection aperture 320, such that the pin 332 extends outward from and perpendicular to the protrusion 300. The connection end 324 of the actuation member 328 may be a loop or hook configured to receive the pin 332 and couple the actuation member 328 with the second cam 40. In other examples, the connection end 324 may extend perpendicularly to the actuation member 328, such that the connection end 324 is received by the connection aperture 320.

The first protrusion 300 of the first cam 32 may also define a second connection aperture 336 positioned proximate the first connection aperture 320. The second connection aperture 336 may be positioned on a second side of the first protrusion 300 opposite the first connection aperture 320. The second connection aperture 336 may be configured to receive a first end 340 of a coiled spring 344. The spring 344 may be a helical spring and may extend between the first cam 32 and the second cam 40. The spring 344 may be operable between a released state (FIG. 7) and a loaded state (FIG. 8). The released and loaded states of the spring 344 may be configured to correspond to inclined and neutral positions of the first cam 32. The released and loaded states of the spring 344 may further be configured to correspond to unlocked and locked positions of the second cam 40.

Referring still to FIGS. 5 and 6, the second cam 40 includes a primary portion 368. The primary portion 368 of the second cam 40 may define a pivot aperture 376 configured to receive a pivot pin 380. The pivot pin 380 may further be coupled to the primary wall 276, such that the second cam 40 is rotatable between an unlocked position (FIG. 7) and a locked position (FIG. 8).

The primary portion 368 of the second cam 40 may include a first lower edge 350 integrally formed with a second lower edge 352. The first and second lower edges 350, 352 may be generally arcuate or curved. Each of the first and second lower edges 350, 352 may be generally convex relative to the bottom of the second cam 40. The first lower edge 350 may be separated from the second lower edge 352 by a step. Together, the first and second lower edges 350, 352 of the second cam 40 may define the second contact surface 44. The second contact surface 44 includes a first portion 356 and a second portion 360. The first portion 356 of the second contact surface 44 extends along the first lower edge 350. Similarly, the second portion 360 of the second contact surface 44 extends along the second lower edge 352. Each of the first and second portions 356, 360 of the second contact surface 44 may be integrally formed with the step.

A second protrusion 364 extends from and may be integrally formed with the primary portion 368 of the second cam 40. The second protrusion 364 may extend in substantially the same direction as the first protrusion 300 relative to the second housing 176 and/or the primary wall 276. The second protrusion 364 may define a third connection aperture 370. The third connection aperture 370 may be configured to receive a second end 372 of the spring 344. The spring 344 extends between the first protrusion 300 of the first cam 32 and the second protrusion 364 of the second cam 40. The spring 344 couples the first cam 32 and the second cam 40. The coupling of the spring 344 to the third connection aperture 370 may be configured to correspond the unlocked and locked positions of the second cam 40 with the unloaded and loaded states of the spring 344. Subsequently, the unlocked and locked positions of the second cam 40 may correspond with the inclined and neutral positions of the first cam 32, as discussed elsewhere herein.

Referring now to FIGS. 5-8, a hook 390 may extend from the primary portion 368 of the second cam 40. The latch hook 390 may be oriented proximate the pivot aperture 376 and the pivot pin 380 of the second cam 40. The hook 390 may further be positioned opposite the second protrusion 364 of the second cam 40. According to various examples, the hook 390 may be generally arcuate or curved relative to the primary portion 368 of the second cam 40. In other examples, the hook 390 may extend linearly from the primary portion 368 of the second cam 40. The hook 390 may be shaped and positioned, such that the hook 390 extends through the retention space 24 of the anchor 20 when the second cam 40 is in the locked position (FIG. 8).

Referring now to FIGS. 4 and 6, the actuation member 328 may extend the length of the sleeve 264. A second end 392 of the actuation member 328 may extend outward from a second open end 394 of the sleeve 264 opposite the first open end 268 of the sleeve 264. The second end 392 of the actuation member may be coupled to a lever 398. The lever 398 may include a handle 400 and a connection end 404. The handle 400 and connection end 404 may be rotatable about a pivot 408. According to various examples, the lever 398 may be positioned within one of the pocket handles 160, such that the handle 400 of the lever 398 is substantially concealed within the cavity 164 of the pocket handle 160.

Referring now to FIG. 4, the lever 398 may be rotated about the pivot 408 when a user applies pressure to the handle 400 of the lever 398 in the direction of arrow A. When the lever 398 is rotated about the pivot 408, the connection end 404 may rotate, applying tension to the actuation member 328 by pulling the second end 392 of the actuation member 328 downward along arrow B. The tension along the actuation member 328 may be translated into a pulling force along arrow B acting on the first protrusion 300 of the first cam 32.

Referring now to FIGS. 5-8, and as discussed elsewhere herein, the latch assembly 28 is shown in the first position with the spring 344 in the unloaded state, the first cam 32 in the inclined position, and the second cam in the unlocked position (FIG. 7) and the second position with the spring 344 in the loaded state, the first cam in the neutral position, and the second cam in the locked position (FIG. 8). When the tension generated by the rotation of the lever 398 is translated through the actuation number 328 and into force on protrusion 300 of the first cam 32, the first cam 32 is rotated in a clockwise direction about the pivot pin 312 as viewed from the side profile of FIGS. 7 and 8. The rotation of the first cam 32 moves the first cam 32, such that the raised edge 294 and part of the first contact surface 34 abut the second protrusion 364 and the second portion 360 of the second contact surface 44, respectively. This contact between the first cam 32 and the second cam 40 positions the first cam 32 to support the second cam 40 in the unlocked position. The proximity of the first and second protrusions 300, 364 removes stress from the spring 344 and allows the spring 344 to remain in the unloaded state. The spring 344 may further be biased into the unloaded state, biasing the second cam 40 into the unlocked position when the first cam 32 is in the inclined position. The bias of the spring 344 may provide tension to hold the second cam 40 in the unlocked position. The latch assembly 28 is configured to remain in the first position absent force applied to push the second cam 40 into the locked position.

When the outer door 16 is moved from the open position to the closed position, the connection portion 214 of the anchor 20 may be at least partially received by the latch opening 256 of second housing 176. When the connection portion 214 is received by the second housing 176, a front edge 402 of the connection portion 214 may be configured to contact a front edge 406 of the second cam 40. As the outer door 16 is moved into the closed position, the front edge 402 of the connection portion 214 applies force to the front edge 406 of the second cam 40. The force pushes the primary portion 368 of the second cam 40 toward the front wall 244 of the second housing 176. The force from the front edge 402 of the connection portion 214 of the anchor 20 causes the second cam 40 to rotate counter-clockwise about the pivot pin 380 as viewed from the side profile of FIGS. 7 and 8. The rotation of the second cam 40 applies force opposite the bias of the spring 344, moving the spring 344 into the loaded state. The second cam 40 is rotated about the pivot pin 380 until the first portion 356 of the second contact surface 44 abuts the first contact surface 34 of the first cam 32. The raised edge 294 of the first cam 32 may be positioned to abut the step between the first and second lower edges 350, 352 of the second cam 40.

When the first and second contact surface 34, 44 are engaged, as shown in FIG. 8, the latch assembly 28 is in the second position. When the latch assembly 28 is in the second position, the hook 390 of the second cam 40 may be engaged with the retention space 24 of the connection portion 214 of the anchor 20. The hook 390 may be positioned, such that the hook 390 extends through the retention space 24 of the anchor 20, coupling the latch assembly 28 with the anchor assembly 170. The latch assembly 28 is configured to remain in the second position absent force applied to the lever 398 to rotate the first cam 32 into the inclined position.

Figure 9:
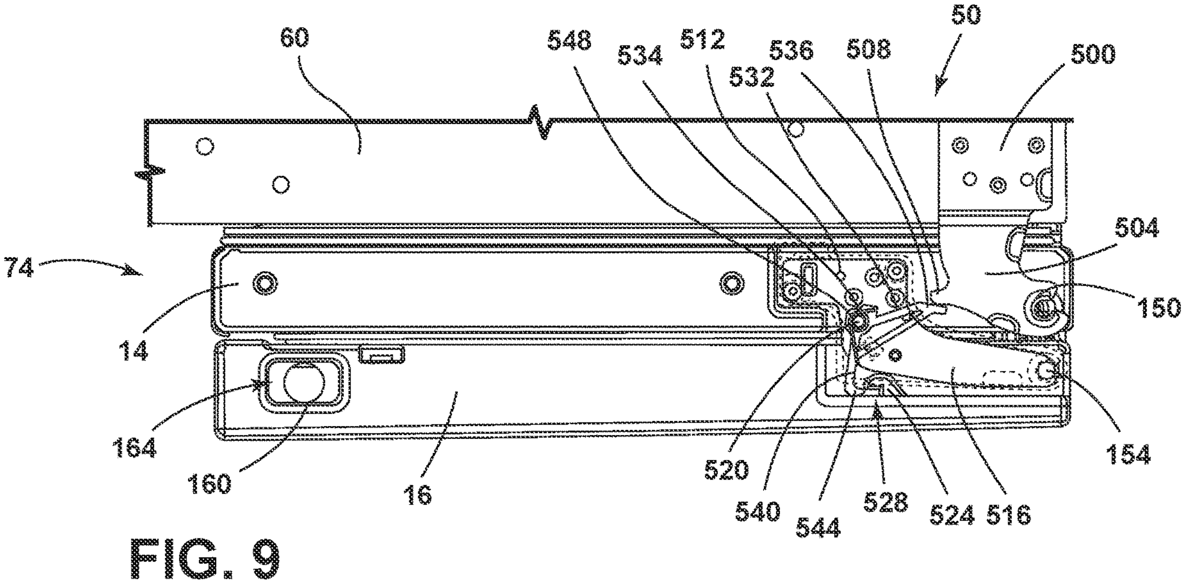
FIG. 9 is a top view of an inner door and an outer door with the inner door in a closed position and the outer door in a closed position, according to various examples.
Figure 10:
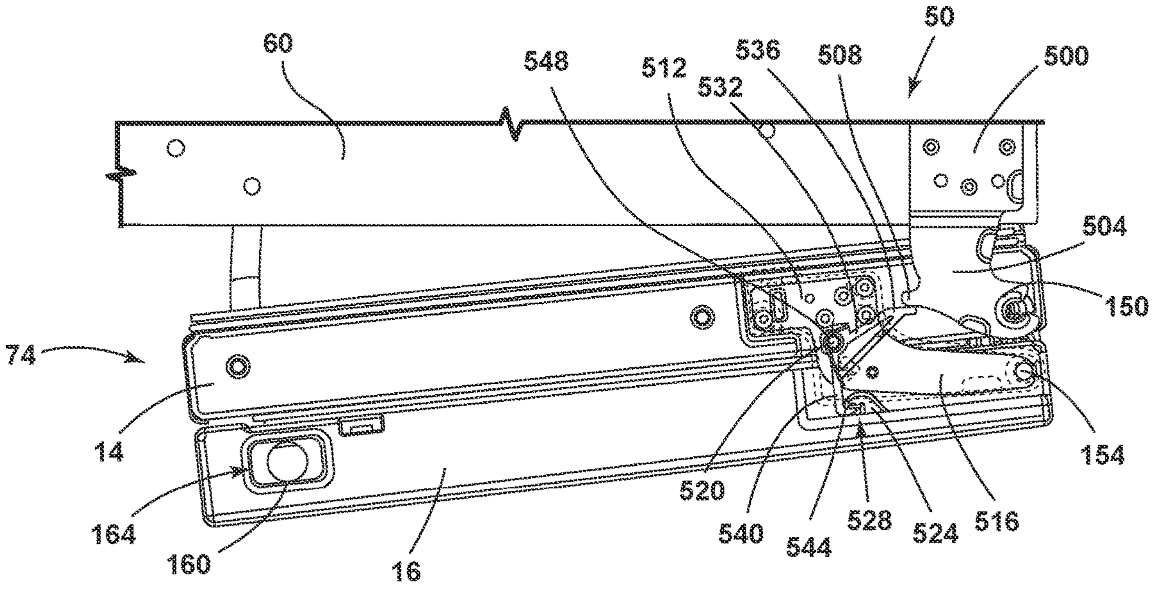
FIG. 10 is a top view of the inner door and the outer door of FIG. 9 with the inner door in an open position and the outer door in a closed position.

Referring now to FIGS. 9 and 10, in various examples, the inner door 14 and the outer door 16 of the door assembly 74 may be secured using a magnetic force as opposed to a latch. Where a magnetic force is used, the first and second hinge assemblies 150, 154 may include a locking member 532 configured to prevent inadvertent release of the outer door 16 from the inner door 14 when the outer door 16 and the inner door 14 are being rotated from the closed position to the open position. It is contemplated that the locking member 532 and the door closure assembly 10 may be used concurrently or separately without departing from the scope of the present disclosure. It will also be understood that the refrigerated door assembly 74 shown is exemplary and that the locking member 532 and first and second hinge assemblies 150, 154 may be used on any door assembly 74, 76 of the appliance 50 (FIG. 1).

The first hinge assembly 150 may include a first hinge plate 500 operably coupled with the cabinet 60 of the refrigerated appliance 50. The first hinge plate 500 may include a first hinge arm 504 extending outward from the first hinge plate 500 and away from a front of the cabinet 60. The first hinge arm 504 may be operably pivotally coupled to the inner door 14 of the door assembly 74 at a first pivot. A protrusion 508 may extend from the first hinge arm 504 opposite the first pivot and in line with the inner door 14.

Similarly, the second hinge assembly 154 may include a second hinge plate 512 operably coupled with a top of the inner door 14. The second hinge plate 512 may include a second hinge arm 516 extending from the second hinge plate 512 and along the outer door 16. The second hinge arm 516 may be pivotally coupled to the outer door 16 of the door assembly 74 at a second pivot. The second pivot may be substantially aligned with the first pivot of the first hinge assembly 150.

A pin 520 may extend from one of the second hinge plate 512 and the second hinge arm 516. The pin 520 may be positioned proximate the front edge of the inner door 14. The pin 520 may be configured to pivotally couple the locking member 532 with the second hinge assembly 154. The pin 520 may be spaced apart from the protrusion 508 of the first hinge assembly 150 and the front edge of the outer door 16.

A retention hook 524 may extend from the front edge of the outer door 16 and toward the inner door 14. The retention hook 524 may be integrally formed with the outer door 16. The retention hook 524 may include a lip extending perpendicular to the front edge of the outer door 16, such that the retention hook 524 and the front edge of the outer door 16 may define a space 528. The space 528 may be generally rectangular in shape, according to various examples. In other examples, the space 528 may be semi-circular, triangular, or any other shape.

The locking member 532 may include a body 534 defining an aperture configured to receive the pin 520. According to various examples, the body 534 may be generally circular. In other examples, the body 534 may be oblong, triangular, square, rectangular, or any other shape. The locking member 532 may be configured to rotate about the pin 520 between a locked and an unlocked position. When the inner door 14 is in the closed position, the locking member 532 may be positioned in the unlocked position. When the inner door 14 is in the open position, the locking member 532 may be positioned in the locked position.

A first arm 536 may extend from a first portion of the body 534 of the locking member 532. A second arm 540 may extend from a second portion of the body 534 of the locking member 532. The first arm 536 and the second arm 540 may define an obtuse angle with a vertex at the center point of the aperture of the body 534 of the locking member 532. The first arm 536 may be a first length configured to span from the pin 520 to the protrusion 508 of the first hinge assembly 150. The first arm 536 may include a first end positioned proximate the protrusion 508 of the first hinge assembly 150. Similarly, the second arm 540 may be a second length configured to span from the pin 520 to the outer edge of the outer door 16. The second arm 540 may include a second end having a foot 544. The foot 544 may be positioned substantially parallel with the outer edge of the outer door 16 and aligned with the space 528 defined by the retention hook 524.

A spring 548 may be positioned over the pin 520 and coupled with the locking member 532. The spring 548 is configured to bias the locking member 532 in the unlocked position. When the inner door 14 is in the closed position, the first end of the first arm 536 is positioned proximate to the protrusion 508 of the first hinge assembly 150. When the inner door 14 begins to move from the closed position to the open position, the first end of the first arm 536 abuts the protrusion 508. As the inner door 14 rotates along the first pivot of the first hinge assembly 150, the contact between the first arm 536 and the protrusion 508 rotates the second arm 540 about the pin 520. As the second arm 540 rotates, the foot 544 of the second arm 540 may be rotated into the space 528 and into engagement with the retention hook 524. The engagement between the foot 544 and the retention hook 524 prevents inadvertent release of the outer door 16 when the inner door 14 is in the open position. This prevents the outer door 16 from swinging open if the inner door 14 is opened rapidly or with force. It also prevents the release of the outer door 16 if the inner door 14 is slammed.

Figure 11:
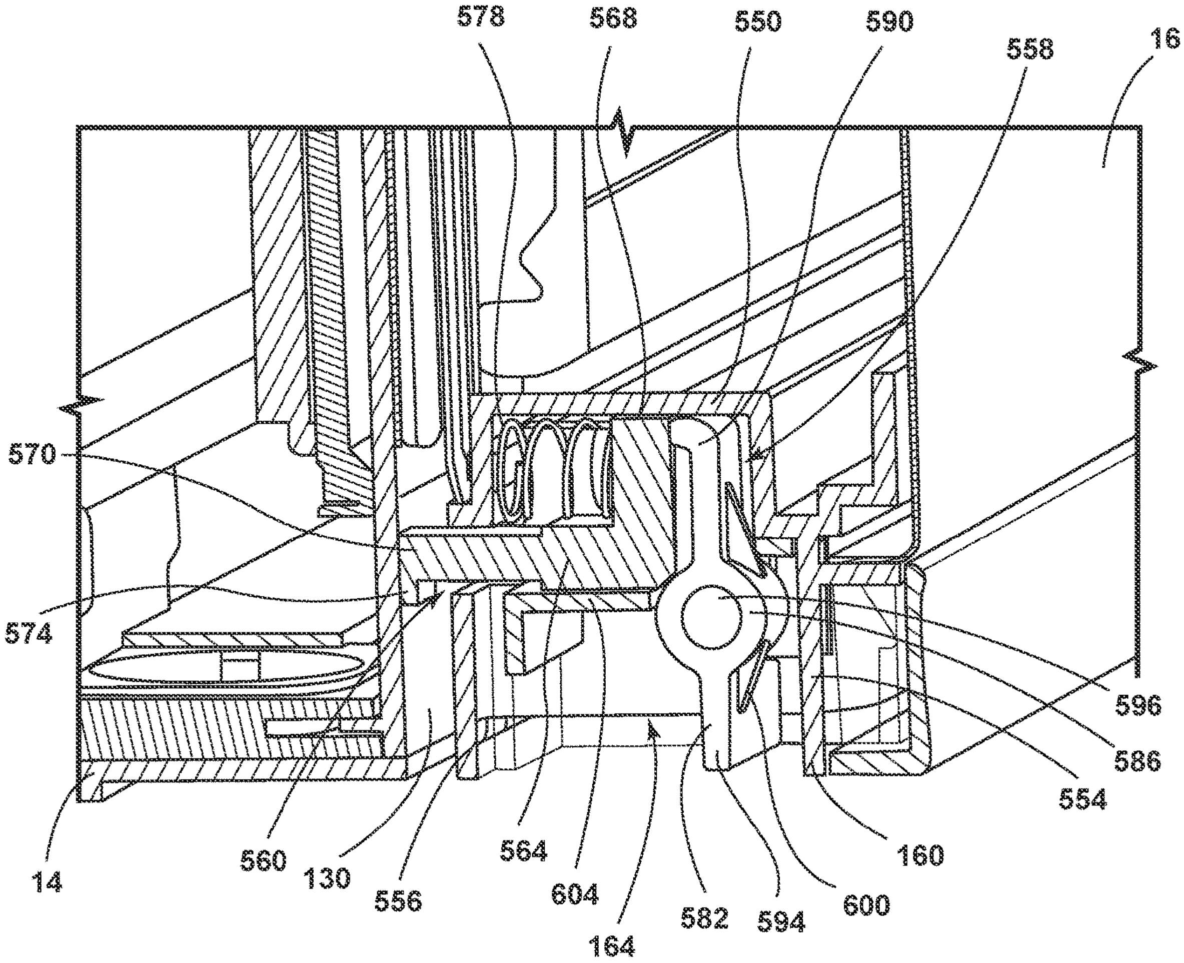
FIG. 11 is a cross-sectional view of a pocket handle taken along line XI-XI of FIG. 1 with a latch in a first position, according to various examples.
Figure 12:
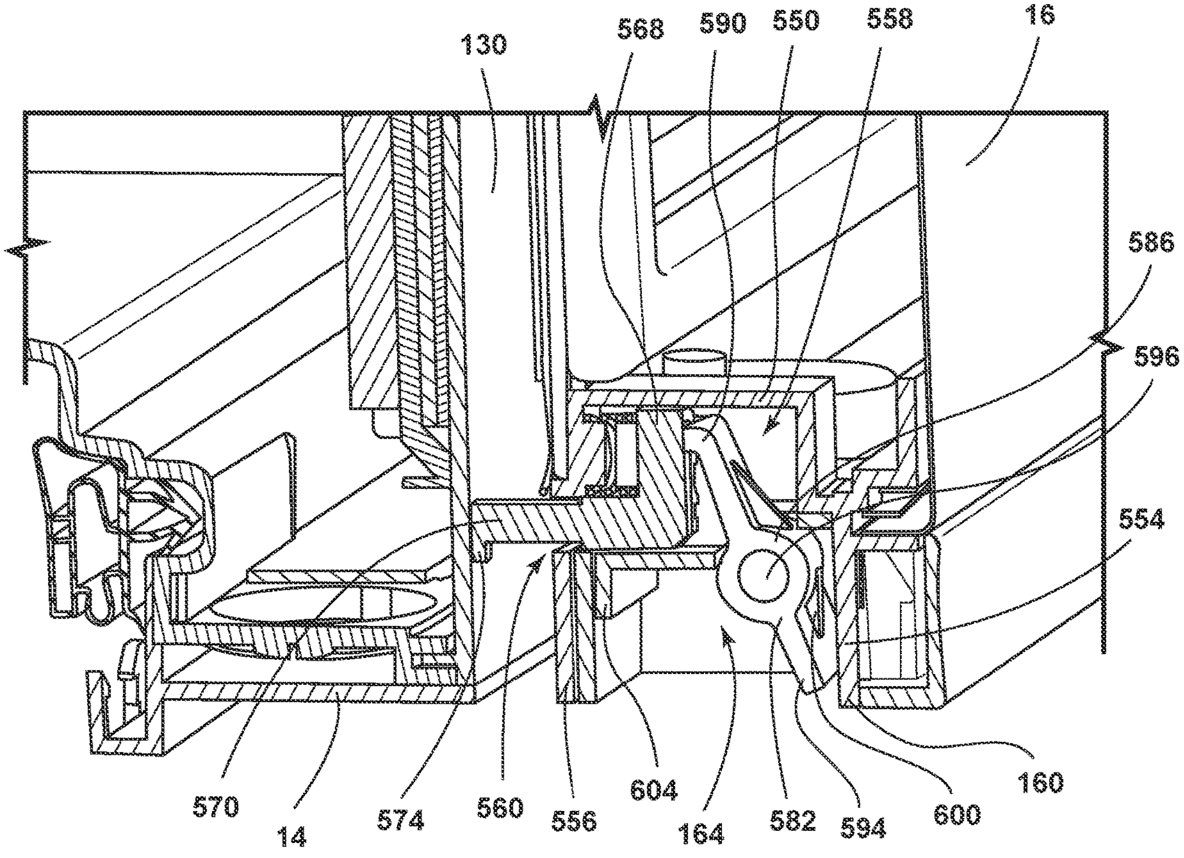
FIG. 12 is a cross-sectional view of the pocket handle of FIG. 11 with the latch in a second position.

Referring now to FIGS. 11 and 12, when a magnetic force is used to couple the inner door 14 and the outer door 16 of door assembly 74, 76 (FIG. 1), a release lever 582 may be positioned within the pocket handle 160 to release the outer door 16 from the inner door 14. It is contemplated that the release lever 582, the locking member 532, and/or the door closure assembly 10 may be used concurrently or separately without departing from the scope of the present disclosure.

The pocket handle 160 may include a housing 550 having a front wall 554 and a rear wall 556 spaced apart by sidewalls. The housing 550 may define a lever cavity 558 in communication with the cavity 164 of the pocket handle 160. The rear wall 556 of the housing 550 may be positioned parallel to the outer panel 130 of the inner door 14 when the outer door 16 is in a closed position. The rear wall 556 may further define an opening 560 proximate the outer panel 130 of the inner door 14. According to various examples, the opening 560 may be generally square. In other examples, the opening 560 may be circular, oblong, rectangular, or shaped like any other higher order polygon.

A release member 564 may be positioned in the cavity 558 and proximate the opening 560. The release member 564 may include a first end 568 and a second end 570. The first end 568 may be positioned within the cavity and may be configured to abut a top wall of the housing 550. The first end 568 may extend parallel to the front wall 554 and the rear wall 556. The first end 568 and the second end 570 may be integrally formed. In various examples, the first end 568 of the release member 564 and the second end 570 of the release member 564 may be joined at a corner. The corner may be oriented at a right angle, such that the second end 570 of the release member 564 is positioned perpendicular to the first end 568 of the release member 564.

The second end 570 of the release member 564 may be aligned with the opening 560 of the rear wall 556 and may have a cross-sectional shape configured to complement the shape of the opening 560. The second end 570 may further include a foot 574 extending from the second end 570. The foot 574 may be positioned perpendicular to the second end 570 and parallel to the outer panel 130 of the inner door 14. In various examples, the second end 570 may be positioned to extend at least partially through the opening 560 of the rear wall 556 of the housing 550, such that the foot 574 is positioned proximate the outer panel 130 of the inner door 14. In other examples, the second end 570 may be positioned to extend through the opening 560 of the rear wall 556 of the housing 550, such that the foot 574 abuts the outer panel 130 of the inner door 14. In still other examples, the second end 570 of the release member 564 may be positioned to extend into the opening 560, such that the foot 574 is positioned substantially flush with the rear wall 556 of the housing 550.

A spring 578 may be positioned between the rear wall 556 and the first end 568 of the release member 564. The spring 578 may abut the rear wall 556 and the first end 568 of the release member 564 and may be compressible by the first end 568 of the release member 564. The spring 578 may be configured to bias the release member 564 toward the front wall 554 of the housing 550.

The lever 582 may be coupled to the sidewall of the housing 550 by a pivot pin 596. The lever 582 may include a body 586 configured to receive the pivot pin 596. A first arm 590 extends from a first end of the body 586. The first arm 590 may extend upward from the body toward the top wall of the housing 550 and parallel to the first end 568 of the release member 564. The first arm 590 of the lever 582 is configured to at least partially abut the first end 568 of the release member 564.

A second arm 594 extends from a second end of the body 586. The second arm 594 is positioned laterally opposing the first arm 590 of the lever 582 and extends downward toward the cavity 164 of the pocket handle 160. The second arm 594 is positioned parallel to the front wall 554 of the housing 550. The second arm 594 of the lever 582 may be accessible by a user to actuate the release member 564, as discussed elsewhere herein.

The lever 582 may be rotatable about the pivot pin 596 between a first position (FIG. 11) and a second position (FIG. 12). A tension spring 600 may be coupled with the lever 582 and may be configured to bias the lever 582 in the first position. The tension spring 600 allows the lever 582 to rotate back into the first position after a user has applied pressure to the second arm 594 of the lever 582 to move the lever 582 into the second position.

A cover 604 may be positioned extending from the rear wall 556 of the housing 550 to the body 586 of the lever 582. The cover 604 may extend along the second end 570 of the release member 564, protecting the release member 564. The cover 604 may further support the release member 564 and may be operably coupled with the sidewall and/or the rear wall 556 of the housing 550.

The first position of the lever 582 may correspond with a neutral position of the release member 564. Similarly, the second position of the lever 582 may correspond with an engaged position of the release member 564. When a user applies force to the second end 570 of the lever 582, the lever 582 rotates about the pivot pin 596, such that the first arm 590 of the lever 582 is inclined rearward toward the rear wall 556 of the housing 550 and the second arm 594 of the lever 582 is inclined toward the front wall 554 of the housing 550 (FIG. 12). The first arm 590 of the lever 582 abuts the first end 568 of the release member 564, pushing the release member 564 from the neutral position into the engaged position. When the release member 564 moves to the engaged position, the foot 574 of the second end 570 of the release member 564 applies a force to the outer panel 130 of the inner door 14. The force from the release member 564 may separate the outer door 16 from the inner door 14, separating the inner door 14 and the outer door 16 so that the outer door 16 may be moved into the open position.

When the release member 564 is in a neutral position (FIG. 11), the spring 578 may be in an unloaded state. When the release member 564 is moved from the neutral position (FIG. 11) to the engaged position (FIG. 12), the spring 578 is compressed between the first end 568 of the release member 564 and the rear wall 556 of the housing 550, placing the spring 578 in a loaded state. In the loaded state, the spring 578 applies a force opposite the first arm 590 of the lever 582. When the user stops applying force to the second arm 594 of the lever 582, the tension spring 600 biases the lever 582 into the first position. When the lever 582 is biased into the first position, the spring 578 biases the release member 564 into the neutral position.

According to one aspect, an appliance door assembly may be provided that includes an inner door including a first housing. The first housing may define a first cavity. An outer door may be selectively coupled with the inner door and may include a second housing. The second housing may define a second cavity. An anchor may be positioned within the first cavity. The anchor may be positioned to extend outward of the first cavity. The anchor may define a retaining space. A latch assembly may be positioned within the second cavity. The latch assembly may include a first cam having a first contact surface. A second cam may have a second contact surface. The first contact surface may be configured to engage with a portion of the second contact surface. The second cam may define a hook. The hook may be selectively engaged with the anchor. A spring may be configured to bias the second cam in a first position. An actuation member may be coupled to the first cam and may be configured to selectively move the first cam into a first position.

According to another aspect, the inner door may define a first opening. The outer door may define a second opening. The first and second openings may be aligned when the outer door is in a closed position.

According to other aspects, the hook of the second cam may be received by the retaining space of the anchor when the outer door is in the closed position and the first cam is in a locked position and the second cam is in a neutral position.

According to yet another aspect, a first end of the actuation member may be coupled to the first cam. A second end of the actuation member may be coupled to an actuator such that pivotal movement of the actuator corresponds with movement of the actuation member between unloaded and loaded states.

According to still other aspects, the unloaded and loaded states of the actuation member may respectively correspond with the unlocked and locked positions of the second cam.

According to another aspect, an appliance door closure assembly may be provided that includes an anchor positioned within a first housing. A latch assembly may be positioned within a second housing. The latch assembly may include a first cam pivotally coupled to a sidewall of the second housing. A second cam may be pivotally coupled to the sidewall of the second housing and may be engaged with the first cam. The second cam may define a hook. A spring may be configured to bias the second cam in an unlocked position.

According to yet another aspect, the first housing may be in connection with an inner door. The second housing may be in connection with an outer door. The outer door may be selectively couplable with the inner door.

According to other aspects, the anchor may extend outward from the first housing and may be at least partially received by the second housing when the outer door is in a closed position.

According to still other aspects, the anchor may abut a first edge of the second cam when the outer door is in the closed position. The second cam may be movable into a second position by the anchor. The hook of the second cam may be engaged with the anchor when the second cam is in the locked position.

According to another aspect, the first cam may include a first contact edge, and the second cam may include a second contact edge. The first and second contact edges may be engaged such that the second contact edge is rotatable relative to the first contact edge.

According to yet another aspect, the second cam may be engaged with an upper edge of the first cam when the second cam is in the unlocked position.

According to other aspects, an appliance door closure assembly may be provided that includes an inner door selectively coupled with an outer door. An anchor may be in connection with the inner door and may define a retention space. A latch assembly may be in connection with the outer door. The latch assembly may include a first cam having a first contact surface and pivotally coupled to a base. A second cam may have a second contact surface engaged with the first contact surface of the first cam. Each of the first and second cams may be movable between a first position and a second position.

According to still other aspects, the anchor and the latch assembly may be aligned such that the anchor may be engaged with the latch assembly when the inner door is coupled with the outer door.

According to yet another aspect, the latch assembly may further include a spring operably coupled to the first cam and the second cam. The spring may be configured to bias the second cam in an unlocked position.

According to other aspects, the second cam may define a hook. The hook may be selectively engaged with the retention space of the anchor.

According to another aspect, the latch assembly may further include an actuation member operably coupled to the first cam and configured to rotate the first cam into an inclined position.

According to yet another aspect, the actuation member may be positioned with a member housing. The actuation member may be movable by an actuator positioned on the outer door.

According to still other aspects, the second contact surface may include a first portion and a second portion. The first portion may be positioned substantially flush with the first contact surface of the first cam when the second cam is in the locked position. The second portion may be positioned substantially flush with the first contact surface of the first cam when the second cam is in the unlocked position.

According to another aspect, the first cam may include an upper edge positioned to abut the second cam when the second cam is in the unlocked position.

According to still other aspects, the base may be integrally formed with a portion of the outer door.

It will be understood by one having ordinary skill in the art that construction of the described disclosure and other components is not limited to any specific material. Other exemplary examples of the disclosure disclosed herein may be formed from a wide variety of materials, unless described otherwise herein.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional central members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the appliance) such that the component may function in any manner described herein.

It is also important to note that the construction and arrangement of the elements of the disclosure as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. An appliance door closure assembly, comprising:
- an anchor positioned within a first housing, wherein the anchor includes an aperture disposed there through; and
- a latch assembly positioned within a second housing, the latch assembly including:
  - a first cam pivotally coupled to a sidewall of the second housing and having a connection aperture;
  - a pin received in the connection aperture and outwardly extending therefrom;
  - a second cam pivotally coupled to the sidewall of the second housing and engaged with the first cam, wherein the second cam defines a hook; and
  - a spring configured to bias the second cam to an unlocked position;
- a lever disposed within a cavity positioned below the second housing; and
- an actuation member having first and second ends, wherein the first end of the actuation member is coupled to the pin, and the second end of the actuation member is coupled to the lever.

2. The appliance door closure assembly of claim 1, wherein the first housing is provided on an inner door and the second housing is provided on an outer door, and further wherein the outer door is configured to selectively couple to the inner door.

3. The appliance door closure assembly of claim 2, wherein the anchor extends outward from the first housing and is at least partially received by the second housing when the outer door is in a closed position.

4. The appliance door closure assembly of claim 3, wherein the anchor abuts a first edge of the second cam to move the second cam into a locked position when the outer door is in the closed position, and further wherein the hook of the second cam is received through the aperture of the anchor when the second cam is in the locked position.

5. The appliance door closure assembly of claim 1, wherein the first cam includes a first contact edge and the second cam includes a second contact edge, and further wherein the first and second contact edges are engaged with one another, such that the second contact edge is rotatable relative to the first contact edge.

6. The appliance door closure assembly of claim 5, wherein the second cam is engaged with an upper edge of the first cam when the second cam is in the unlocked position.

7. An appliance door closure assembly, comprising:

an inner door selectively coupled with an outer door;

an anchor disposed within a first housing of the inner door and defining a retention space, wherein the retention space is provided in the form of an aperture disposed through the anchor; and a latch assembly disposed within a second housing of a cavity of the outer door, the latch assembly including:

a base;

a first cam pivotally coupled to the base and having a first contact surface and a connection aperture;

a pin received in the connection aperture and outwardly extending therefrom; and a second cam having a second contact surface engaged with the first contact surface of the first cam, wherein the latch assembly is movable between a first position and a second position;

an actuation member coupled to the pin and configured to selectively move the first cam into an inclined position.

8. The appliance door closure assembly of claim 7, wherein the anchor and the latch assembly are aligned, such that the anchor is engaged with the latch assembly when the inner door is coupled with the outer door.

9. The appliance door closure assembly of claim 7, wherein the latch assembly further includes a spring operably coupled to the first cam and the second cam, wherein the spring is configured to bias the second cam in an unlocked position.

10. The appliance door closure assembly of claim 7, wherein the second cam defines a hook, wherein the hook is selectively engaged with the aperture of the anchor.

11. The appliance door closure assembly of claim 7, wherein the actuation member is configured to downwardly rotate the first cam into the inclined position from a neutral position.

12. The appliance door closure assembly of claim 7, wherein the actuation member is positioned within a sleeve disposed within the cavity of the outer door.

13. The appliance door closure assembly of claim 7, wherein the second contact surface includes a first portion and a second portion, and further wherein the first portion is positioned substantially flush with the first contact surface of the first cam when the second cam is in a locked position and the second portion is positioned substantially flush with the first contact surface of the first cam when the second cam is in an unlocked position.

14. The appliance door closure assembly of claim 7, wherein the first cam includes an upper edge positioned to abut the second cam when the second cam is in the unlocked position.

15. The appliance door closure assembly of claim 7, wherein the base is integrally formed with a portion of the outer door.

* * * * *